United States Patent
Pursifull et al.

(10) Patent No.: US 8,069,665 B2
(45) Date of Patent: *Dec. 6, 2011

(54) STORED COMPRESSED AIR MANAGEMENT FOR IMPROVED ENGINE PERFORMANCE

(75) Inventors: Ross Dykstra Pursifull, Dearborn, MI (US); Ralph Wayne Cunningham, Milan, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/761,051

(22) Filed: Apr. 15, 2010

(65) Prior Publication Data

US 2011/0132335 A1   Jun. 9, 2011

(51) Int. Cl.
*F02B 33/44* (2006.01)
*F02B 21/00* (2006.01)
*F02B 37/04* (2006.01)
*F02M 25/07* (2006.01)

(52) U.S. Cl. ......... 60/611; 60/605.1; 60/605.2; 60/602

(58) Field of Classification Search ............ 60/611, 60/605.1, 605.2, 602; 123/568.12; 701/54, 701/102; F02B 21/00, 37/04
See application file for complete search history.

(56) References Cited

U.S. PATENT DOCUMENTS

| | | | |
|---|---|---|---|
| 4,019,323 A | 4/1977 | Zuhn | 60/606 |
| 4,211,082 A | 7/1980 | Bristol | 60/605.1 |
| 4,641,619 A | 2/1987 | Okimoto et al. | 60/277 |
| 4,696,165 A | 9/1987 | Bucher | 60/611 |
| 5,064,423 A | 11/1991 | Lorenz et al. | 60/611 |
| 5,429,100 A | 7/1995 | Goto et al. | 123/559.1 |
| 5,461,860 A | 10/1995 | Schegk | 60/611 |
| 5,611,203 A | 3/1997 | Henderson et al. | 60/605.2 |
| 5,669,365 A * | 9/1997 | Gartner et al. | 123/568.12 |
| 5,707,214 A | 1/1998 | Schmidt | 417/109 |
| 5,819,538 A | 10/1998 | Lawson, Jr. | 60/611 |
| 6,328,003 B1 | 12/2001 | Gaertner et al. | 60/605.2 |
| 6,415,749 B1 | 7/2002 | Sturman et al. | 123/70 R |
| 6,813,887 B2 | 11/2004 | Sumser et al. | 60/611 |
| 6,826,910 B1 | 12/2004 | Easton | 60/597 |
| 6,922,997 B1 | 8/2005 | Larson et al. | 60/611 |
| 6,945,048 B2 * | 9/2005 | Whiting | 60/602 |

(Continued)

FOREIGN PATENT DOCUMENTS

DE   102006008783 A1 *   9/2006

(Continued)

OTHER PUBLICATIONS

Vetrovec, John. "Fluid-Dynamic Supercharger." SAE Technical Paper Series. 2008-01-0299. Apr. 14-17, 2008. Detroit, Michigan. 15 pages. SAE International; Warrendale, PA.

(Continued)

*Primary Examiner* — Thai Ba Trieu
(74) *Attorney, Agent, or Firm* — Allan J. Lippa; Alleman Hall McCoy Russell & Tuttle LLP

(57) ABSTRACT

A method for providing air to a combustion chamber of an engine, the engine including a compressor and a boost tank selectably coupled to an intake manifold. The method includes varying a relative amount of engine exhaust in air pressurized in the boost tank based on engine operating conditions, and discharging the air pressurized in the boost tank to the intake manifold.

12 Claims, 13 Drawing Sheets

U.S. PATENT DOCUMENTS

| | | | |
|---|---|---|---|
| 7,004,154 B2 * | 2/2006 | Joyce et al. | 60/605.1 |
| 7,062,918 B2 | 6/2006 | Walker et al. | 60/751 |
| 7,076,952 B1 | 7/2006 | Vetrovec | 60/598 |
| 7,251,925 B2 | 8/2007 | Paradise | 60/39.281 |
| 7,367,327 B2 | 5/2008 | Piriou et al. | 60/605.2 |
| 7,665,302 B2 * | 2/2010 | Nemeth et al. | 60/611 |
| 7,854,118 B2 * | 12/2010 | Vetrovec | 60/605.1 |
| 7,866,156 B2 * | 1/2011 | Nemeth et al. | 60/605.2 |
| 2002/0014077 A1 | 2/2002 | Long | 60/611 |
| 2006/0070381 A1 * | 4/2006 | Parlow et al. | 60/612 |
| 2006/0107662 A1 | 5/2006 | Warmstrom et al. | 60/605.2 |
| 2006/0168958 A1 | 8/2006 | Vetrovec | 60/599 |
| 2007/0119169 A1 | 5/2007 | Berger et al. | 60/600 |
| 2008/0066467 A1 * | 3/2008 | Nemeth et al. | 60/611 |
| 2008/0133110 A1 | 6/2008 | Vetrovec | 60/600 |
| 2008/0271447 A1 | 11/2008 | Abel et al. | 60/598 |
| 2009/0044788 A1 * | 2/2009 | Shutty et al. | 123/559.1 |
| 2009/0235663 A1 * | 9/2009 | Nemeth et al. | 60/605.2 |
| 2010/0175671 A1 * | 7/2010 | Gerum | 123/568.29 |
| 2010/0318268 A1 * | 12/2010 | Jager et al. | 701/54 |
| 2011/0014067 A1 * | 1/2011 | Mayr | 417/364 |
| 2011/0041496 A1 * | 2/2011 | Mayr | 60/611 |

FOREIGN PATENT DOCUMENTS

| | | | |
|---|---|---|---|
| DE | 102006008785 A1 * | 3/2007 | |
| DE | 102007059145 A1 * | 6/2009 | |
| DE | 102009026469 A1 * | 12/2010 | |
| EP | 531277 A2 * | 3/1993 | |
| EP | 0754843 A2 | 1/1997 | |
| EP | 1956213 A1 * | 8/2008 | |
| GB | 2422872 B | 1/2007 | |
| WO | WO 2008088554 A1 * | 7/2008 | |
| WO | WO 2009100883 A1 * | 8/2009 | |
| WO | WO 2009103588 A1 * | 8/2009 | |

OTHER PUBLICATIONS

Pursifull, Ross Dykstra, "Condensate Management for Motor-Vehicle Compressed Air Storage Systems," U.S. Appl. No. 12/761,104, filed Apr. 15, 2010, 52 pages.

Pursifull, Ross Dykstra et al., "Stored Compressed Air Management and Flow Control for Improved Engine Performance," U.S. Appl. No. 12/761,076, filed Apr. 15, 2010, 52 pages.

* cited by examiner

US 8,069,665 B2

STORED COMPRESSED AIR MANAGEMENT FOR IMPROVED ENGINE PERFORMANCE

TECHNICAL FIELD

This application relates to the field of motor-vehicle engineering, and more particularly, to air induction in motor vehicle engine systems.

BACKGROUND AND SUMMARY

A boosted engine may offer greater fuel efficiency and lower emissions than a naturally aspirated engine of similar power. During transient conditions, however, the power, fuel efficiency, and emissions-control performance of a boosted engine may suffer. Such transient conditions may include rapidly increasing or decreasing engine load, engine speed, or mass air flow. For example, when the engine load increases rapidly, a turbocharger compressor may require increased torque to deliver an increased air flow. Such torque may not be available, however, if the turbine that drives the compressor is not fully spun up. As a result, an undesirable power lag may occur before the intake air flow builds to the required level.

It has been recognized previously that a turbocharged engine system may be adapted to store compressed air and to use the stored, compressed air to supplement the air charge from the turbocharger compressor. Accordingly, U.S. Pat. No. 5,064,423 describes a system in which compressed air is stored in a boost tank and is dispensed when insufficient compressed air is available from the turbocharger compressor.

However, the inventors herein have recognized that other transient control issues may occur during decreasing engine load. For example, when a throttle valve in a boosted engine system closes, the compressed air charge upstream of the throttle valve is released to the atmosphere to avoid compressor surge. This may be done by opening a compressor by-pass valve, for example. Such actions erode fuel efficiency, however, as the mechanical energy used to compress the air charge is wasted when the air is released to the atmosphere. Moreover, in engine systems equipped with low-pressure (LP) exhaust-gas recirculation (EGR), merely opening the by-pass valve may not adequately prepare the engine for low-load operation. This is because the intake air charge will be diluted with exhaust gas during mid- to high-load operation. When the throttle valve closes, this exhaust gas remains trapped behind the throttle valve. During closed-throttle conditions, however, non-diluted, fresh air may be required for reliable combustion. Thus, even applying the applying the approach of U.S. Pat. No. 5,064,423, combustion instability during closed-throttle conditions may still occur.

The inventors herein have further recognized that a properly configured compressed-air management system can be used to address both of the transient-control issues identified above. Therefore, one embodiment provides a method for providing air to a combustion chamber of an engine, the engine including a compressor and a boost tank selectably coupled to an intake manifold. The method comprises varying a relative amount of engine exhaust in air pressurized in the boost tank based on engine operating conditions, and discharging the air pressurized in the boost tank to the intake manifold. In this manner, air containing an appropriate relative amount of exhaust gas may be stored and later supplied to the engine intake during closed- and open-throttle conditions. For example, by varying the relative amount of exhaust gas in the stored air, it is possible to provide a desired mixture of stored gas, which may be different depending on whether the gas is to be used during open- or closed-throttle conditions.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

Figure 1:
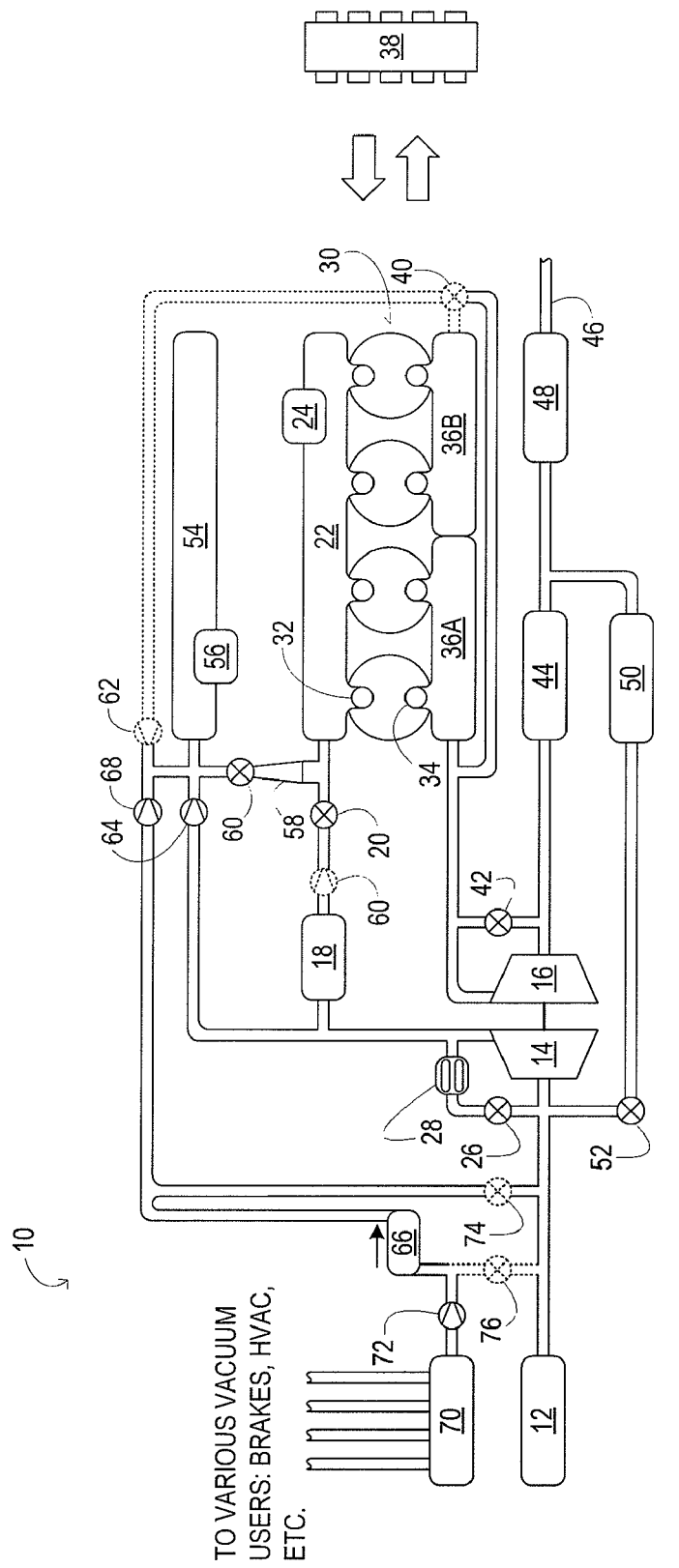
FIG. 1 schematically shows aspects of an example engine system in accordance with an embodiment of this disclosure.

The subject matter of this disclosure is now described by way of example and with reference to certain illustrated embodiments. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 schematically shows aspects of an example engine system 10 in one embodiment. In engine system 10, fresh air is introduced via air cleaner 12 and flows to compressor 14. The compressor may be any suitable intake-air compressor—a motor-driven or driveshaft driven supercharger compressor, for example. In engine system 10, however, the compressor is a turbocharger compressor mechanically coupled to turbine 16, the turbine driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed. As shown in FIG. 1, compressor 14 is coupled, through charge-air cooler 18, to throttle valve 20; the throttle valve is coupled to intake manifold 22. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24.

In engine system 10, compressor by-pass valve 26 and fixed flow restrictor 28 are coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

In one embodiment, compressor by-pass valve 26 may be a two-state valve having a fully open state and a fully closed state. Therefore, as shown in FIG. 1, fixed flow restrictor 28 is coupled in series with the compressor by-pass valve. In one embodiment, the fixed flow restrictor may be an orifice-type flow restrictor; in another embodiment, it may be a laminar-flow type flow restrictor comprising one or more laminar-flow elements. In either case, the fixed flow restrictor may be configured so that when the compressor by-pass valve is opened, sufficient air flow is discharged from the outlet to the inlet to prevent surge, while still allowing some boost pressure accumulate at the outlet. Accordingly, the dimensions of the fixed flow restrictor may be chosen to keep as much pressure downstream of compressor 14 as possible—for rapid re-pressurization—but to keep the compressor out of surge conditions. This scenario is further considered below, with reference to FIG. 2.

Figure 2:
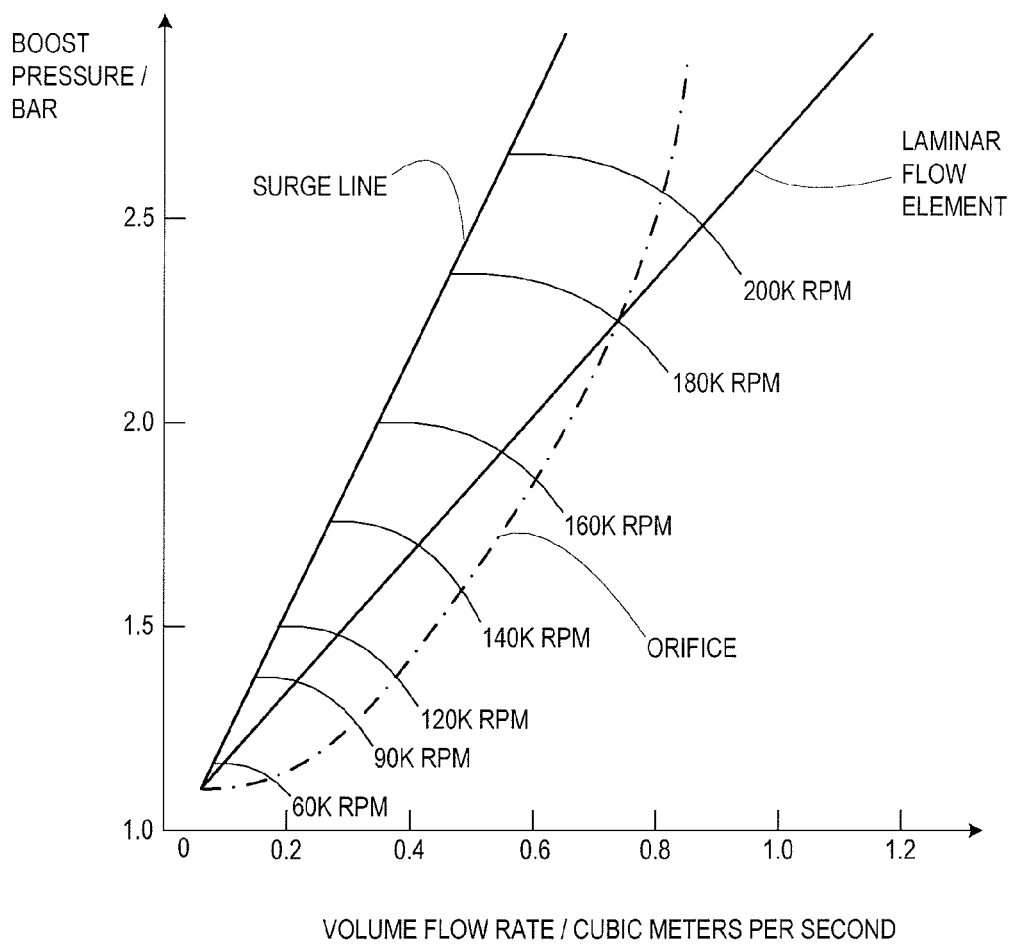
FIG. 2 is a graph of compressor boost pressure versus flow rate in accordance with an embodiment of this disclosure.

FIG. 2 shows an example graph of boost pressure versus volumetric flow rate for an example turbocharger compressor. The graph shows seven curved segments of constant compressor speed ranging from 60,000 revolutions per minute to 200,000 revolutions per minute. Intersecting the seven curved segments are lines labeled SURGE LINE, ORIFICE, and LAMINAR FLOW ELEMENT.

The line labeled ORIFICE shows the result of by-passing the compressor with an orifice-type fixed flow restrictor of a given size. The graph demonstrates that such a flow restrictor coupled in the by-pass flow enables the boost pressure to accumulate while staying a safe distance from the surge line of the compressor. With an orifice-type flow restrictor, the flow rate varies as the square root of the boost pressure. The surge line, in contrast, may exhibit an almost linear relationship between boost pressure and flow rate. As a result, it is advisable to use an orifice-type flow restrictor sized to stay well away from the surge line at moderate compressor speed if surge is to be avoided at high compressor speed. This situation manages boost and flow rate to avoid surge but maintains some boost when the by-pass valve is open.

By contrast, the laminar flow element provides an improved characteristic, as shown in FIG on the line labeled LAMINAR. 2. With the laminar flow element, the flow rate varies linearly with boost pressure. Therefore, a fixed laminar-flow type flow restrictor can be chosen that more closely tracks the surge line over most of the operating speed range of the compressor. Increasing the air compression rate under by-passed conditions may be advantageous in embodiments where compressed air is stored for later use, as further described hereinafter.

Returning now to FIG. 1, intake manifold 22 is coupled to a series of combustion chambers 30 through a series of intake valves 32. The combustion chambers are further coupled to one or more exhaust manifold sections via a series of exhaust valves 34. In the embodiment illustrated in FIG. 1, exhaust manifold sections 36A and 36B are shown. Other embodiments may include more or fewer exhaust manifold sections. Configurations having more than one exhaust manifold section enable effluent from different combustion chambers to be directed to different locations in the engine system, as further described hereinafter.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. In particular, the valve timing may be adjusted so that combustion is initiated when a controlled amount of exhaust from a previous combustion is present in one or more combustion chambers. Such adjusted valve timing may enable an 'internal EGR' mode useful for reducing peak combustion temperatures under selected operating conditions. In some embodiments, adjusted valve timing may be used in addition to the 'external EGR' modes described hereinafter.

FIG. 1 shows electronic control system 38, which may be any electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a combustion chamber during ignition. The electronic control system may also be configured to command the opening, closure and/or adjustment of various other electronically actuated valves in the engine system—throttle valves, compressor by-pass valves, waste gates, EGR valves and shut-off valves, for example—as needed to enact any of the control functions described herein. Further, to assess operating conditions in connection with the control functions of the engine system, the electronic control system may be operatively coupled to a plurality of sensors arranged throughout the engine system—flow sensors, temperature sensors, pedal-position sensors, pressure sensors, etc.

Continuing in FIG. 1, combustion chambers 30 may be supplied one or more fuels: gasoline, alcohols, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition in any variant.

In embodiments where fuel is supplied by direct injection, different combustion chambers 30 may be charged with unequal amounts of fuel during selected operating conditions. For instance, engine system 10 may be configured for a DFSO mode, where some of the combustion chambers receive no fuel and merely pump the air admitted through their respective intake valves. Under such conditions, the engine system may be configured to store the air pumped and thereby compressed by the unfueled combustion chambers. Accordingly, FIG. 1 shows two-way valve 40 coupled to exhaust manifold section 36B. When the combustion chambers coupled to exhaust manifold section 36B are unfueled due to DFSO operation, the two-way valve may be positioned to direct the effluent of the combustion chambers—i.e., the pumped, compressed air—to a locus of the engine system where the air can be stored (vide infra). In this manner, one or more unfueled combustion chambers of the engine may be used as an air pump—a functional equivalent of other air pumps described hereinafter. Under other conditions, when the combustion chambers coupled to exhaust manifold section 36B are fueled, the two-way valve may be positioned to direct the effluent of the combustion chambers to turbine 16.

As shown in FIG. 1, exhaust from the one or more exhaust manifold sections is directed to turbine 16 to drive the turbine. When reduced turbine torque is desired, some exhaust may be directed instead through waste gate 42, by-passing the turbine. The combined flow from the turbine and the waste gate then flows through exhaust-aftertreatment stage 44. The nature, number, and arrangement of exhaust-aftertreatment stages may differ in the different embodiments of this disclosure. In general, one or more exhaust-aftertreatment stages may include one or more exhaust-aftertreatment catalysts configured to catalytically treat the exhaust flow, and thereby reduce an amount of one or more substances in the exhaust flow. For example, one exhaust-aftertreatment catalyst may be configured to trap $NO_x$ from the exhaust flow when the exhaust flow is lean, and to reduce the trapped $NO_x$ when the exhaust flow is rich. In other examples, an exhaust-aftertreatment catalyst may be configured to disproportionate $NO_x$ or to selectively reduce $NO_x$ with the aid of a reducing agent. In still other examples, an exhaust-aftertreatment catalyst may be configured to oxidize residual hydrocarbons and/or carbon monoxide in the exhaust flow. Different exhaust-aftertreatment catalysts having any such functionality may be arranged in wash coats or elsewhere in the exhaust-aftertreatment stages, either separately or together. In some embodiments, the exhaust-aftertreatment stages may include a regenerable soot filter configured to trap and oxidize soot particles in the exhaust flow.

Continuing in FIG. 1, all or part of the treated exhaust from exhaust aftertreatment stage 44 may be released into the ambient via exhaust conduit 46, in which silencer 48 is also coupled. Depending on operating conditions, however, some treated exhaust may be diverted instead through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. Thus, engine system 10 is adapted to provide external, low-pressure (LP) EGR in addition to the internal EGR described above. The rotation of the compressor, in addition to the relatively long LP EGR flow path in engine system 10, provides excellent homogenization of the exhaust gas into the intake air charge. Further, the disposition of EGR take-off and mixing points provides very effective cooling of the exhaust gas for increased available EGR mass and improved performance; as shown in FIG. 1, the recirculated exhaust traverses exhaust-aftertreatment device 44, EGR cooler 50, as well as charge-air cooler 18.

In engine system 10, compressor 14 is the primary source of compressed intake air, but under some conditions, the amount of intake air available from the compressor may be inadequate. Such conditions include periods of rapidly increasing engine load, such as immediately after start-up, on tip-in, or upon exiting DFSO. In addition, the intake air charge supplied by the compressor may not always be well-suited for changing engine-load conditions. The intake air charge may be highly diluted with EGR, for example, under conditions where fresh air is needed. Such conditions include abrupt throttle valve closure and/or tip-out, for example.

In view of the issues noted above, engine system 10 includes boost tank 54. The boost tank may be any reservoir of suitable size configured to store compressed air for later discharge. In one embodiment, the boost tank may be configured to store air at the maximum pressure generated by compressor 14. Various inlets, outlets, and sensors may be coupled to the boost tank. In the embodiment shown in FIG. 1, pressure sensor 56 is coupled to the boost tank and configured to respond to the air pressure therewithin.

In engine system 10, boost tank 54 is selectably coupled to intake manifold 22. More specifically, the boost tank is configured to discharge compressed air to the intake manifold via boost tank discharge valve 60. The boost tank discharge valve may be a normally closed valve commanded to open when a flow of air from the boost tank to the intake manifold is desired. In the embodiment shown in FIG. 1, pressure recovery cone 58 is coupled fluidically between the boost tank and the intake manifold. Accordingly, compressed air is conducted through the pressure recovery cone on discharge from the boost tank. The pressure recovery cone may be any section of conduit having a gradually increasing cross-sectional area normal to the direction of flow. The pressure recovery cone may be installed anywhere between the boost tank and the intake manifold and may be bent into a curved (e.g., nautilus) shape if needed for efficient packing. Compared to the same length of conduit having a constant cross-sectional area, the pressure recovery cone converts flow energy back to pressure energy during flow conditions by suppressing flow detachment from the conduit walls. In one embodiment, pressure recovery cone 58 may have a 15 degree cone angle and may reduce the flow rate of the compressed air from 200 meters per second to 50 meters per second. Based on known principles of fluid dynamics, this reduction in flow rate may conserve 47 kilopascals of pressure for air initially pressurized to 200 kilopascals.

In engine system 10, compressed air from boost tank 54 is delivered downstream of throttle valve 20. In some scenarios, the compressed air may be delivered when the throttle valve is at least partially open. Therefore, check valve 60 may be coupled upstream of the throttle valve and oriented to prevent the release of compressed air from the boost tank backwards through the throttle valve. In other embodiments, the check valve may be omitted and other measures taken to prevent backwards flow through the throttle valve (vide infra).

As noted hereinabove, the pumping of air by unfueled combustion chambers of the engine during DFSO provides one way to charge boost tank 54 with compressed air. In the embodiment shown in FIG. 1, two-way valve 40 may be oriented such that effluent from one or more unfueled cylinders flows through check valve 62 and into the boost tank. The check valve allows compressed air from exhaust manifold section 36B to be stored in the boost tank but prevents stored compressed air from flowing back to the exhaust manifold section.

A turbocharged engine system may include still other structure to enable a boost tank to be filled under selected operating conditions. In engine system 10, for example, boost tank 54 is coupled to compressor 14 via check valve 64. The check valve allows compressed air from the compressor to flow into the boost tank under conditions of high throttle-inlet pressure (TIP) and to be stored therein, but it prevents stored compressed air from flowing back to the compressor under conditions of low TIP.

Boost tank 54 is further coupled to air pump 66 via check valve 68. This check valve allows compressed air from the air pump to flow into and be stored in the boost tank when the outlet pressure of the air pump is high, but it prevents stored compressed air from flowing back to the air pump when the outlet pressure is low. Air pump 66 may be virtually any air pump of the vehicle in which engine system 10 is installed. In one embodiment, the air pump may be driven by an electric motor. In another embodiment, the air pump may be driven by a crankshaft or other rotating or reciprocating shaft of the engine system. In another embodiment, the air pump may be driven by a wheel of the vehicle in which the engine system is installed. In yet another embodiment, the air pump may be an exhaust-driven or compressor-driven pressure amplifier—i.e., a gas-flow driven air compressor.

In the particular embodiment illustrated in FIG. 1, air pump 66 is further coupled to vacuum manifold 70 of engine system 10 via check valve 72. Accordingly, air pump 66 may be configured to operate as a vacuum pump under certain operating conditions and as a pressure pump under other operating conditions. During both conditions, the air pump is operated so as to impel air from the side coupled to check valve 72 to the side coupled to check valve 68. For vacuum operation, shut-off valve 74 is opened, and shut-off valve 76 is closed. The vacuum manifold is thereby evacuated, providing vacuum for braking and other vehicle operations. In this configuration, the air pump presents minimal mechanical or electrical load on the engine system. For pressure operation, shut off valve 76 is opened, and shut-off valve 74 is closed. Boost tank 54 is thereby pressurized with air drawn from air cleaner 12.

Figure 3:
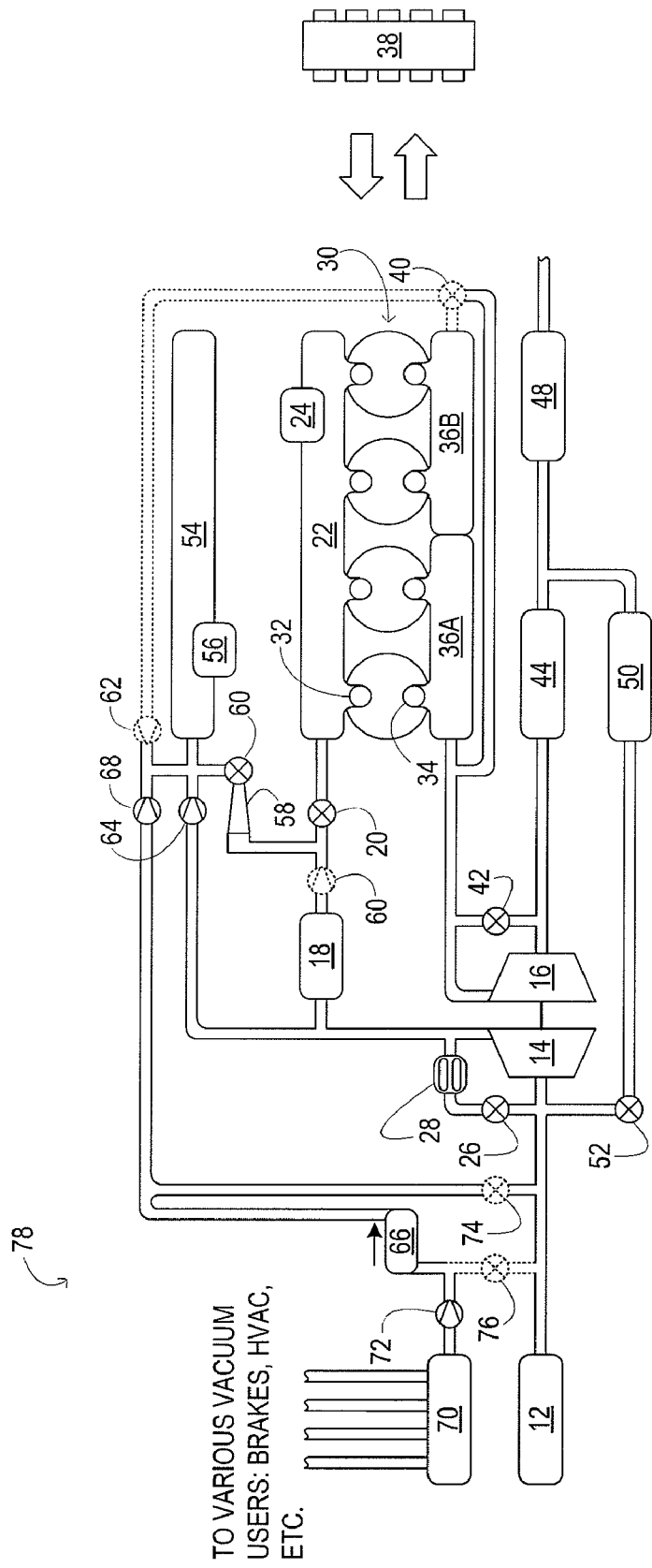
FIGS. 3 and 4 schematically show aspects of other example engine systems in accordance with embodiments of this disclosure.

FIG. 3 schematically shows aspects of another engine system 78 in one embodiment. Engine system 78 differs from engine system 10 in that boost tank 54 is coupled upstream, not downstream, of throttle valve 20. As a result, the flow of air into the intake manifold is controlled in the same manner regardless of how the TIP is established (stored, compressed air from the boost tank or compressed air directly from compressor 14 under high-TIP conditions).

Figure 4:
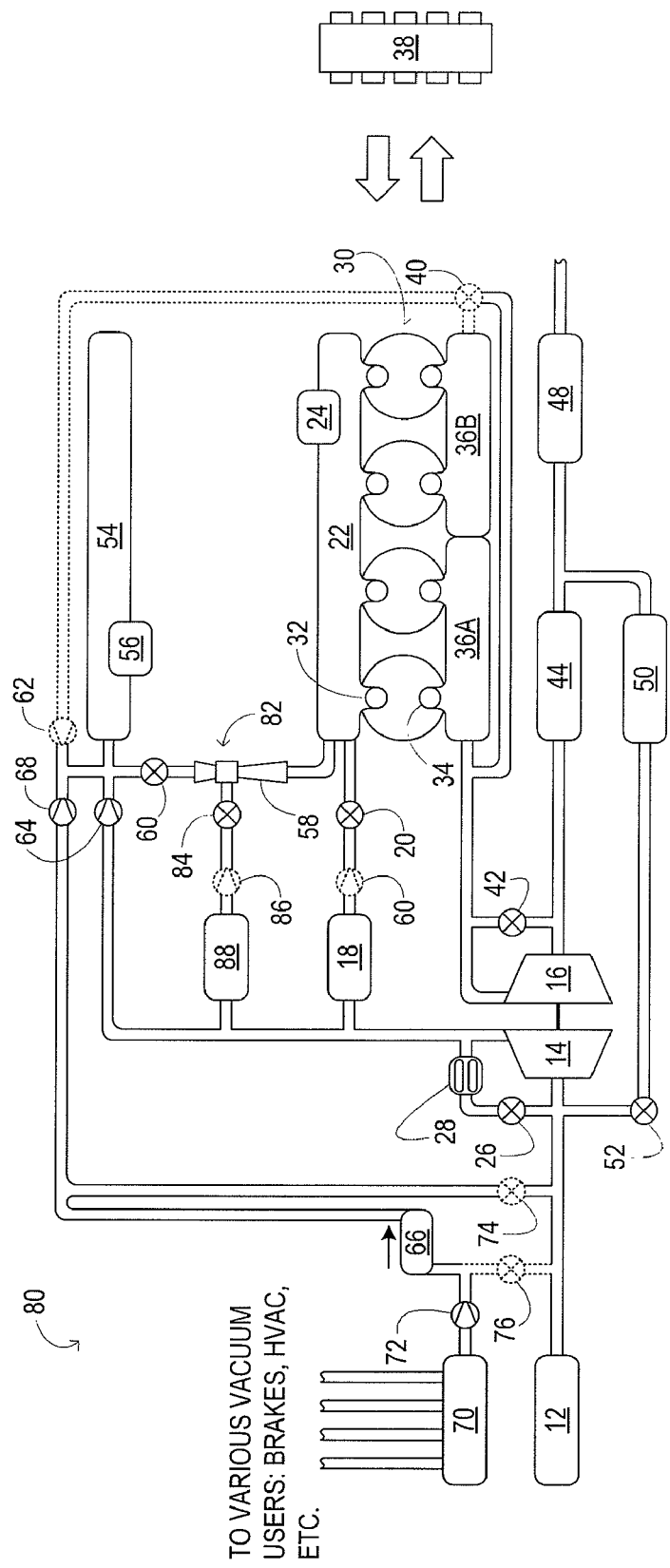

FIG. 4 schematically shows aspects of another engine system 80 in one embodiment. Engine system 80 differs from engine system 10 in that boost tank 54 is coupled to pressure recovery cone 58 via air ejector 82. The air ejector has a primary inlet coupled to the boost tank via boost tank discharge valve 60, an outlet coupled to intake manifold 22, and a secondary inlet arranged off of the main flow. When air flows from the primary inlet through to the outlet, a partial vacuum develops at the secondary inlet, causing additional air to be drawn in and discharged from the outlet. Although the air charge provided to the intake manifold will be lower in pressure than the air discharged from the boost tank, the overall air mass delivered may be significantly greater. Using the air ejector in this manner offers at least two advantages in engine systems having a boost tank. First, the volume of the boost tank may be decreased to save space, while maintaining the overall amount of available boost. Second, the time required to fill the boost tank may be reduced in view of its lower volume.

The secondary inlet of air ejector 82 may be coupled to air cleaner 12 or to virtually any other air source. In the embodiment shown in FIG. 4, however, the secondary inlet of the air ejector is coupled to the outlet of compressor 14 via auxiliary throttle valve 84 in series with check valve 86 and charge-air cooler 88. The charge-air cooler may be any suitable air-to-air or air-to-water heat exchanger, for example. In this manner, engine system 80 is adapted to take advantage of whatever boost level may have accumulated at the outlet of the compressor at the time when compressed air is drawn from the boost tank. In other embodiments, the auxiliary throttle valve may be coupled between the outlet of the air ejector and the intake manifold, rather than upstream of the secondary inlet.

The example above underscores the importance of maintaining a high air pressure in the boost tank for flexibility in responding to transient conditions. Another way to increase the air pressure in the boost tank is to introduce a small amount of volatile liquid fuel in the boost tank, along with the compressed air. Evaporation of the volatile fuel will increase the total gas pressure within the tank, further compressing the stored air.

Figure 5:
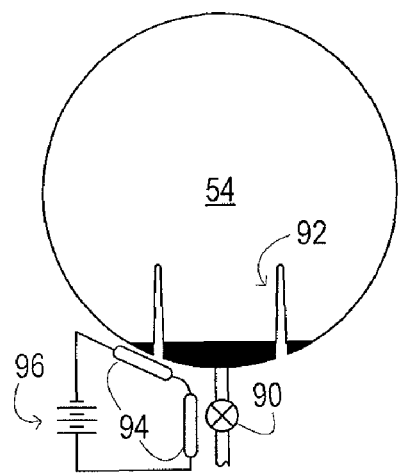
FIGS. 5-7 schematically show aspects of an example boost tank with provision for draining condensate in accordance with different embodiments of this disclosure.

In the various engine systems described above, and in others fully consistent with this disclosure, pressurizing air or an air/exhaust mixture in a boost tank may cause water vapor to condense inside the boost tank. As shown in FIG. 5, therefore, drain valve 90 is coupled to boost tank 54. The drain valve may be opened as needed to drain condensate from the boost tank. The condensate may be drained onto the road surface below the vehicle in liquid form, or it may be directed to the exhaust system of the vehicle, evaporated, and discharged as a vapor. In one embodiment, the drain valve may be an electronically controlled, normally closed valve configured to open at the command of electronic control system 38. As further described hereinafter, the electronic control system may be configured to command the draining of the condensate at a time when the condensate is unfrozen, and when draining event is unlikely to be noticed by the occupants of the vehicle. More particularly, the electronic control system may be configured to delay opening the drain valve until a noise or speed level in the vehicle is above a threshold and the condensate is (or is predicted to be) unfrozen. As such, it is possible that a significant quantity of condensate may accumulate in the boost tank before a suitable opportunity for draining arises.

Accordingly, FIG. 5 shows baffles 92 disposed within boost tank 54. The baffles are configured to limit the motion of the condensate in the boost tank—i.e., to limit the degree to which condensate may slosh around inside the boost tank. In this manner, the baffles may reduce the level of unwelcome noise associated with the boost tank.

FIG. 5 also shows resistive heating elements 94 arranged near boost tank 54 and drain valve 90. In one embodiment, the resistive heating elements may be arranged in thermal communication with one or more of the drain valve, the boost tank, and the condensate within the boost tank. The resistive heating elements are operatively coupled to voltage source 96, which may be any suitable voltage source of the vehicle in which the boost tank is installed. In one embodiment, the voltage source may be a power grid to which the vehicle is connected when parked, refueled, or serviced. In another embodiment, the voltage source may be a switchable voltage source linked to a battery of the vehicle. Further, the voltage source may be switched on or off at the command of electronic control system 38, as necessary to ensure that the drain valve and the condensate are unfrozen at the intended time of draining.

Figure 6:
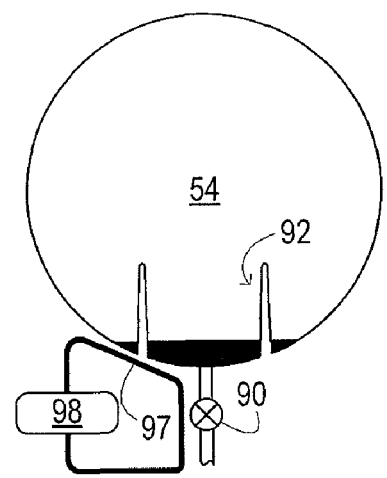
Figure 7:
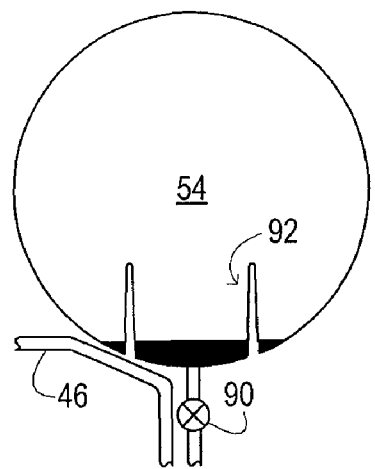

The embodiments shown in FIGS. 6 and 7 differ from that of FIG. 5 in the manner in which heat is supplied to the condensate and the drain valve. In the embodiment shown in FIG. 6, coolant conduit 97 is arranged near boost tank 54 and drain valve 90. The coolant conduit is configured to circulate engine coolant through heat exchanger 98, which may be a radiator of the engine system in which the boost tank is included. In the embodiment shown in FIG. 7, exhaust conduit 46 is arranged near the boost tank and the drain valve. The conduits shown in these embodiments may be arranged in thermal communication with one or more of the drain valve, the boost tank, and the condensate within the boost tank. Continuous or controlled, intermittent heating from these conduits may ensure that the drain valve and the condensate in the boost tank are unfrozen at the intended time of draining.

The configurations described above enable various methods for providing air to a combustion chamber of an engine. Accordingly, some such methods are now described, by way of example, with continued reference to above configurations. It will be understood, however, that the methods here described, and others fully within the scope of this disclosure, may be enabled via other configurations as well. The methods presented herein include various measuring and/or sensing events enacted via one or more sensors disposed in the engine system. The methods also include various computation, comparison, and decision-making events, which may be enacted in an electronic control system operatively coupled to the sensors. The methods further include various hardware-actuating events, which the electronic control system may command selectively, in response to the decision-making events.

In the configurations described above, compressed air for filling a boost tank may be supplied via a turbocharger compressor under some conditions and via one or more air pumps under other conditions. Such configurations enable control of the relative amount of exhaust gas stored along with the compressed air, inasmuch as air from the compressor may be diluted with EGR, while air from the air pumps will typically not be diluted. Further, the air stored in the boost tank may be discharged in response to at least two conditions: a tip-in condition, where the throttle valve opens suddenly and the compressor is spinning too slowly to provide the desired MAP; and a tip-out condition, where the throttle valve closes suddenly and the available air charge has more exhaust gas than can be tolerated. In some embodiments, the desired relative amount of exhaust gas in the air supplied from the boost tank may differ under these two conditions. In particular, it may be desirable that the air supplied in response to tip-in contain more exhaust gas than the air supplied in response to tip-out. One way to address this issue is to preemptively fill the boost tank with air or with an air-exhaust mixture in a manner that anticipates operating conditions when the stored air is later discharged.

Figure 8:
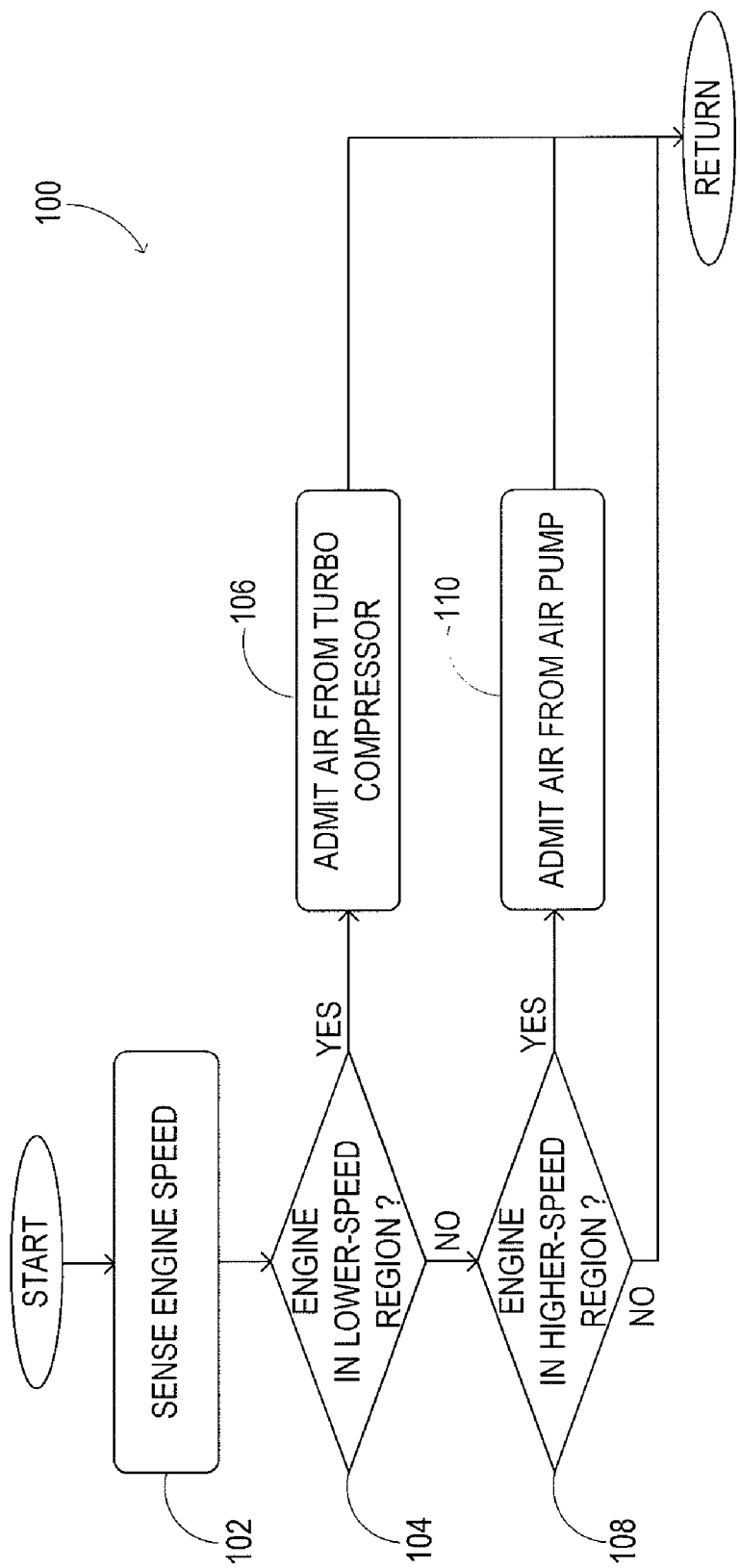
FIG. 8 illustrates an example method for selecting a source for filling a compressed air boost tank in an engine system in accordance with an embodiment of this disclosure.

Accordingly, FIG. 8 illustrates an example method 100 for selecting a source for filling a boost tank based on engine operating conditions. The method rests on the premise that tip-in is likely to occur when the engine speed is initially high, and tip-out is likely to occur when the engine speed is initially low. Therefore, the method fills the boost tank with EGR-diluted air from the compressor at relatively low engine speeds and with fresh air from an air pump at relatively high engine speeds. In this manner, the boost tank is pressurized with air having a first relative amount of engine exhaust before increasing a throttle valve opening; such air may be discharged from the boost tank when the throttle valve opening is increased. Further, the boost tank may be pressurized with air having a second, lower, relative amount of engine exhaust before decreasing the throttle valve opening; such air may be discharged from the boost tank when the throttle valve opening is decreased. Accordingly, the relative amount of engine exhaust in the air pressurized in the boost tank may be varied based on engine operating conditions.

Method 100 begins at 102, where the engine speed is sensed. The engine speed may be sensed by interrogating any engine-system sensor responsive to engine speed or a surrogate thereof. Such sensors may include an engine-rotation sensor, a mass air flow sensor, etc. The method then advances to 104, where it is determined whether the engine is in a lower-speed region. The lower-speed region may correspond to any region where the engine speed is above idle but below a first threshold value. As such, an EGR valve in the engine system may be at least partly open, and the compressor may be inducting at least some exhaust gas in the lower-speed region. When the engine speed is below the first threshold value, it is unlikely that stored boost will be needed to displace exhaust-diluted air from the intake, but more likely that stored boost will be needed to avert turbo lag. If it is determined that the engine is in the lower-speed region, then the method advances to 106, where effluent of the turbocharger compressor is admitted to and stored in the boost tank. During or prior to admission of such air, an EGR valve that regulates a flow of engine exhaust to the turbocharger compressor may be adjusted.

In one embodiment, such effluent may be admitted during throttle valve closure. And in embodiments where an appropriate flow restrictor (flow restrictor 28, for example) is included in the compressor by-pass, storing may continue even when the by-pass valve of the compressor is open and when air is flowing through the by-pass. In one embodiment, a fill valve may be opened (actively or passively) to admit air to the boost tank.

However, if it is determined at 104 that the engine is not in the lower-speed region, then the method advances to 108, where it is determined whether the engine is in a higher-speed region. The higher-speed region may correspond to any region where the engine speed is above a second threshold value higher than the first threshold value. When the engine speed is above the second threshold value, it is unlikely that stored boost will be needed to avert turbo lag, but more likely that stored boost will be needed to displace exhaust-diluted air from the intake. Therefore, if it is determined that the engine is in the higher-speed region, then the method advances to 110, where air from an air pump distinct from the turbocharger compressor is admitted to the boost tank. Following 106, 108, or 110, method 100 returns.

In other embodiments, relative amounts of air admitted from the compressor and the air pump, as well as the opening amount of the EGR valve may be varied in any manner whatsoever so that air having a greater relative amount of engine exhaust is stored during lower engine-speed conditions, and air having a lower relative amount of engine exhaust is stored during higher engine speed conditions. In one embodiment, for example, effluent of the turbocharger compressor may be pressurizing and stored in the boost tank when a relative amount of engine exhaust in an effluent of the compressor is below a threshold. Such air may be stored in the boost tank and discharged during throttle-valve closure.

The above method illustrates only one of many contemplated embodiments where a decision to admit air from a turbocharger compressor or from an air pump is made based on engine operating conditions. Other methods are envisaged for determining whether or not, how, and at what level to operate the air pump and thereby make compressed air available for admittance to the boost tank. One such method is illustrated in FIG. 9.

Figure 9:
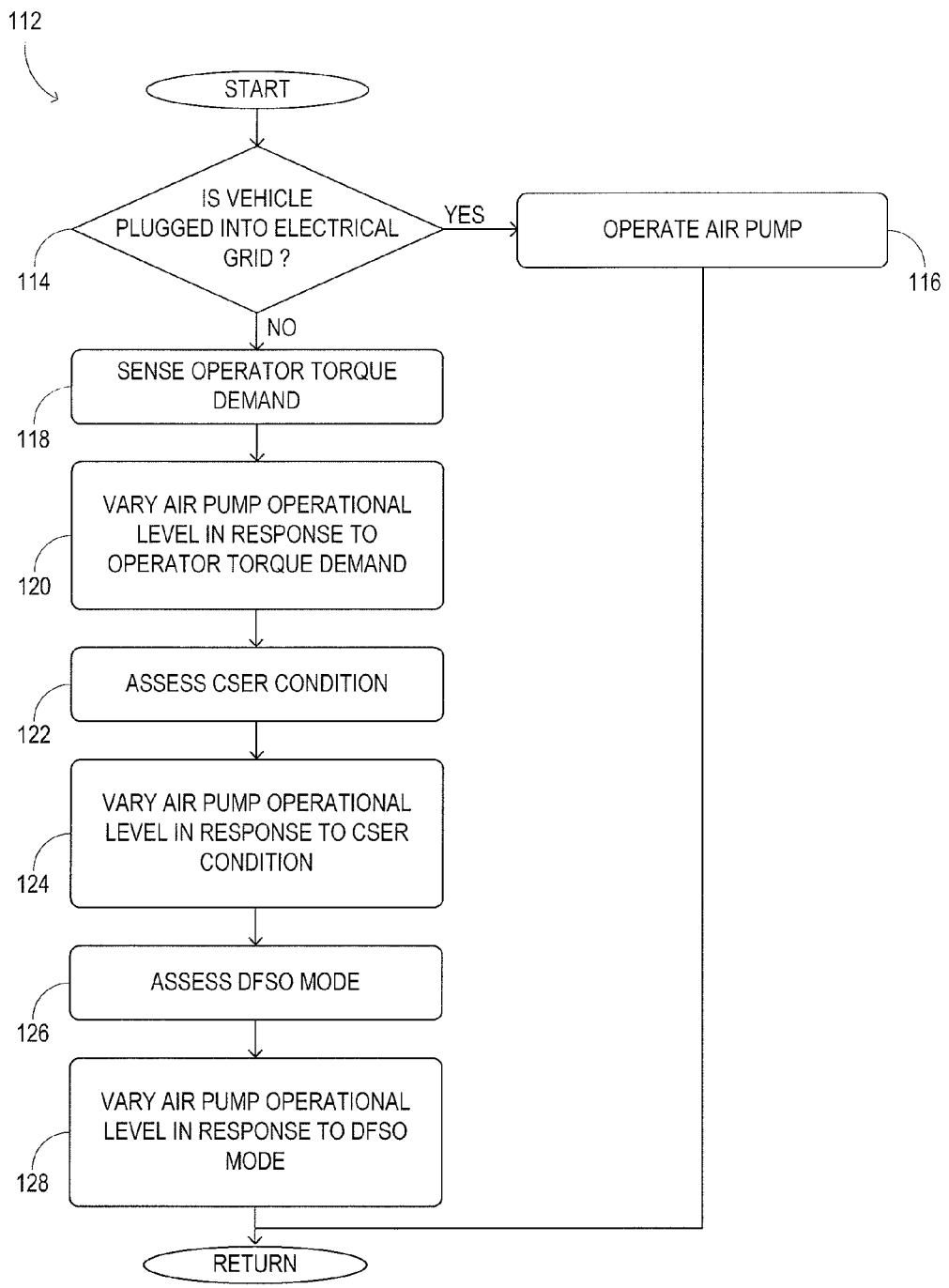
FIG. 9 illustrates an example method for operating a pressure pump in an engine system based on driver demand, cold-start emissions reduction (CSER), and deceleration fuel shut off (DFSO), in accordance with an embodiment of this disclosure.

FIG. 9 illustrates an example method 112 for operating an air pump based on such factors as operator engine torque demand, CSER, DFSO, and whether or not the vehicle is coupled to an external electrical grid. The method begins at 114, where it is determined whether the vehicle is plugged into an external electrical grid. If the vehicle is plugged into the external electrical grid, then the method advances to 116, where the air pump is operated. In embodiments where the operational level of the pump may be selected from among a plurality of operational levels, the pump may be run at maximum level when the vehicle is plugged into the external electrical grid. (Depending on the particular embodiment being considered, the operational level of the air pump may correspond to pumping rate, pressurization, air flow, mechanical or electrical load presented by the air pump, number of unfueled combustion chambers during DFSO, etc.) Accordingly, the effluent of the air pump may be admitted to the boost tank selectively, based on an availability of stationary electrical grid power. In another embodiment, the pump may be operated at this level also when regenerative braking generates electric power in excess of what the vehicle battery can accept.

However, if it is determined that the vehicle is not plugged into an external electrical grid, then method 112 advances to 118, where an operator engine torque demand in the vehicle is sensed. The operator engine torque demand may be sensed by interrogating any suitable sensor responsive to operator engine torque demand, such as a pedal position sensor. The method then advances to 120, where the operational level of the pump is varied in response to the operator engine torque demand—e.g., increased as operator engine torque demand decreases and decreased as operator engine torque demand increases. In one embodiment, the operational level may fall to zero when the operator engine torque demand is at a maximum. In one embodiment, the operational level may be set to provide maximum pressurization when the operator's foot is off the pedal and the vehicle is moving.

Method 112 then advances to 122, where a CSER condition of the engine system is assessed. In one embodiment, assessing the CSER condition may comprise measuring one or more temperatures—ambient temperature, exhaust-system temperature, catalyst temperature, etc. The method then advances to 124, where the operational level of the air pump is varied in response to the CSER condition. This action reflects the fact that increased engine load—including increased shaft work—is relatively inexpensive when the CSER demand is high. In one embodiment, the operational level of the air pump may be increased at low catalyst temperatures and decreased at high catalyst temperatures. The method then advances to 126, where the DFSO mode of the engine system—e.g., the number of unfueled combustion chambers—is sensed. The method then advances to 128, where the operational level of the pump is varied in response to the DFSO mode. For example, the operational level of the pump may be increased when a greater number of combustion chambers of the engine are unfueled and decreased when a lesser number of combustion chambers of the engine are unfueled. This action reflects the fact that extra mechanical energy for operating the air pump is generally available during DFSO conditions, and in engine systems configured to operate at least one unfueled combustion chamber as an air pump, those one or more cylinders will be available for pumping air during DFSO conditions. Following 116 or 128, method 112 returns. It will be noted that this method effectively provides a pneumatic brake regeneration mechanism, which uses braking energy to compress intake air.

Figure 10:
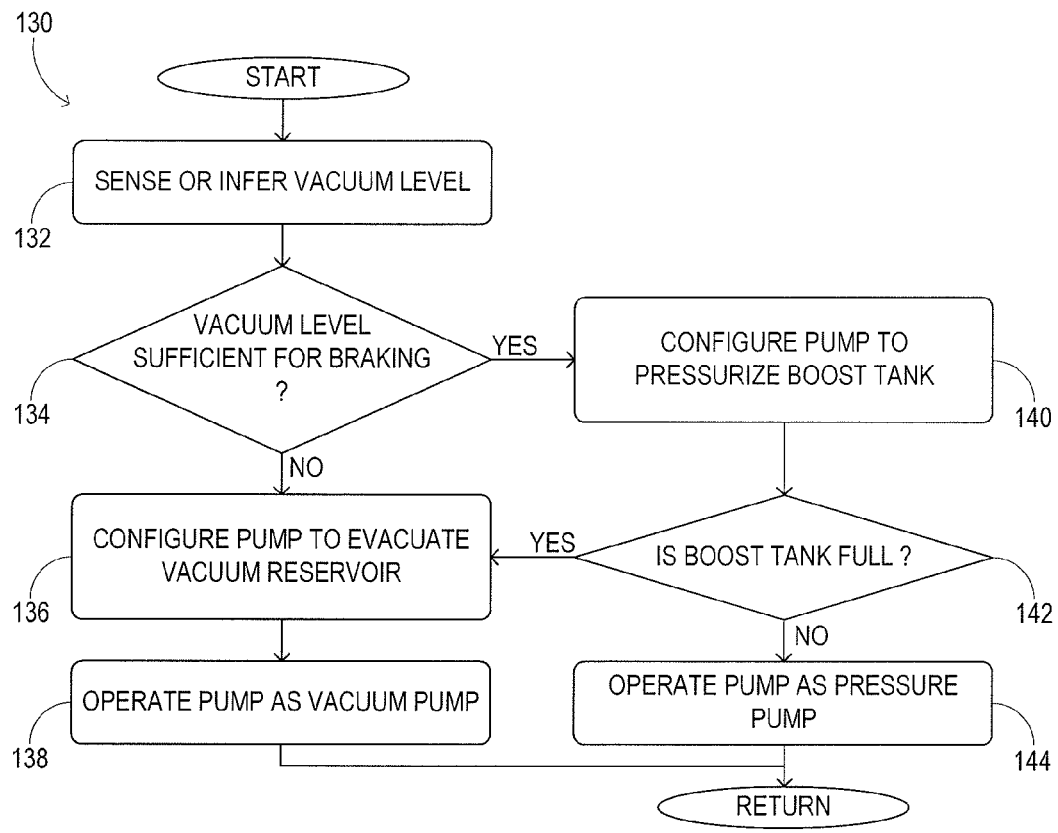
FIG. 10 illustrates an example method for controlling a configurable vacuum/pressure pump in an engine system based on vacuum availability and compressed air demand in accordance with an embodiment of this disclosure.

As the method above illustrates, various factors may influence the operational level of an air pump used to provide air to a boost tank. Other methods address more particular considerations that arise when the air pump is a configurable vacuum/pressure pump. FIG. 10 illustrates one such method by way of example.

Method 130 begins at 132, where a vacuum level in a vacuum manifold of an engine system is sensed or inferred. The method then advances to 134, where it is determined whether the vacuum level sensed or inferred is sufficient for vehicle braking. If the vacuum level is not sufficient, then the method advances to 136, where the air pump is configured to evacuate the vacuum reservoir, and to 138, where the air pump is operated as a vacuum pump. The air pump may be configured to evacuate the vacuum reservoir by actuating one or more electronically controlled valves coupled to the air pump, as noted hereinabove in the detailed description of FIG. 1.

If the vacuum level is sufficient for vehicle braking, then method 130 advances to 140, where the air pump is configured to pressurize the boost tank. In this manner, air from the air pump may be admitted selectively to the boost tank, based on the pressure in the vacuum reservoir. The air pump may be configured to pressurize the boost tank by actuating one or more electronically controlled valves coupled to the pump, as noted hereinabove. The method then advances to 142, where it is determined whether the boost tank is filled to a desired pressure. If the boost tank is filled to the desired pressure, then the method returns to 136. In this state, the air pump is configured to maintain the vacuum of the vacuum manifold and presents minimal mechanical or electrical load on the engine system. However, if the boost tank is not filled to the desired level, the method advances to 144, where the air pump is operated as a pressure pump. Following 138 or 144, the method returns.

The methods described above relate to filling of the boost tank under various conditions. Other methods relate to controlling the manner in which compressed air is discharged from the boost tank to improve engine operation.

Figure 11:
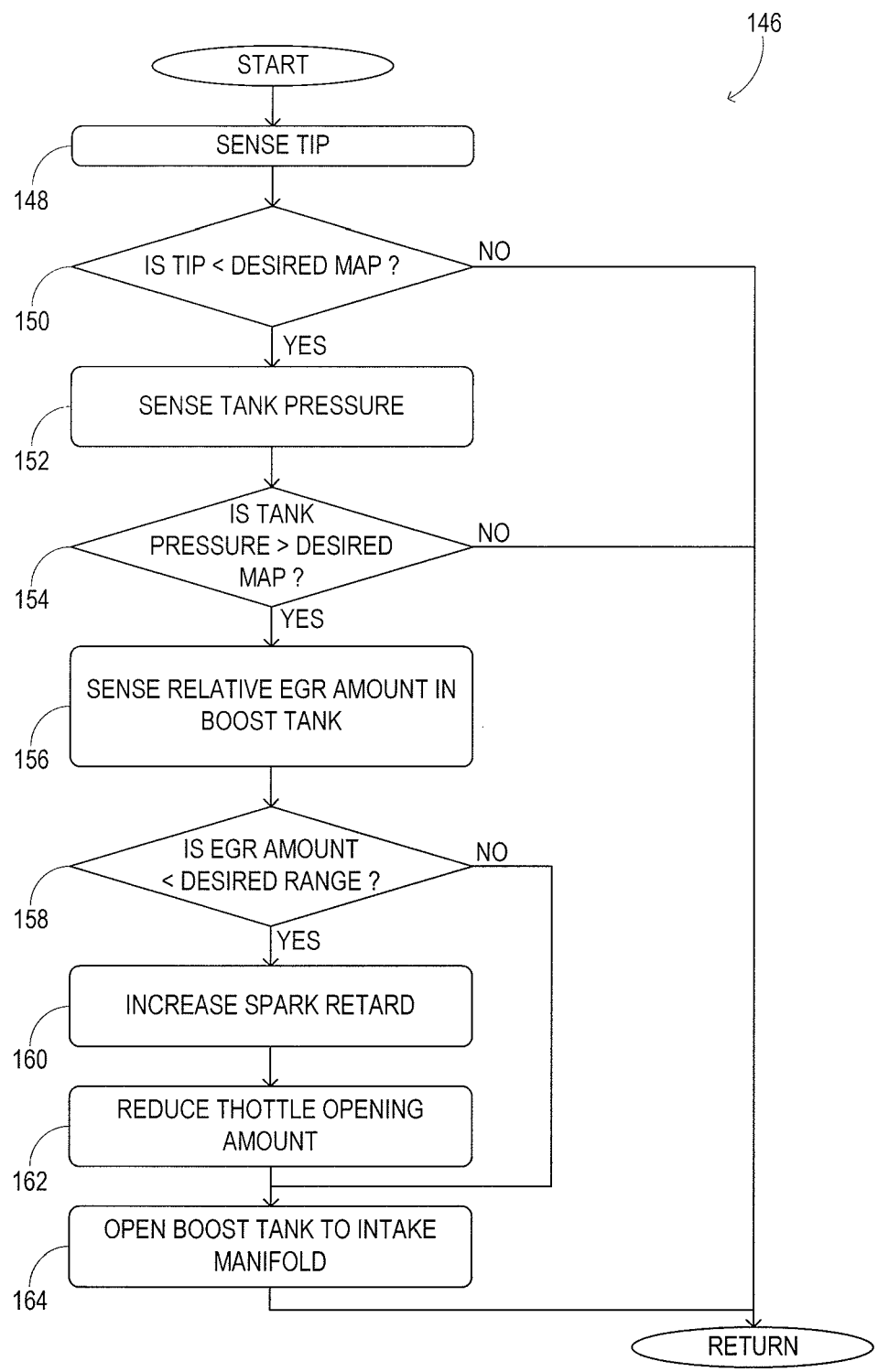
FIG. 11 illustrates an example method for supplying compressed air from a boost tank in an engine system in accordance with an embodiment of this disclosure.

FIG. 11 illustrates an example method 146 for discharging compressed air from a boost tank in one embodiment. The method may be enacted in response to full or partial throttle valve opening, or under other conditions. Method 146 begins at 148, where the engine system TIP is sensed. The TIP may be sensed via a suitable pressure sensor coupled upstream of the throttle valve, or it may be inferred based on other factors. The method then advances to 150, where it is determined whether the sensed TIP is less than the desired MAP for current operating conditions. If TIP is less than the desired MAP, then the method advances to 152, where the pressure in the boost tank is sensed; otherwise, the method returns. The pressure in the boost tank may be sensed by interrogation of a pressure sensor coupled to the boost tank, or in any other suitable manner. In one embodiment, the air in the boost tank may be discharged once the throttle is fully open, and when the tank pressure is above TIP. In this case, a fully open throttle is taken to mean MAP<MAP_desired.

Continuing in FIG. 11, method 146 then advances to 154, where it is determined whether the boost tank pressure is greater than the desired MAP. If the boost tank pressure is greater than the desired map, then the method advances to 156, where the relative EGR amount in the boost tank is sensed; otherwise the method returns. In one embodiment, the relative EGR amount may be sensed via a sensor (e.g., a humidity sensor or carbon dioxide sensor). In another embodiment, the relative EGR amount may be inferred or recalled from a memory of an electronic control system rather than sensed per se. The method then advances to 158, where it is determined whether the sensed EGR amount is below a desired range. If the sensed relative EGR amount is below the desired range, then the method advances to 160, where a level of spark retard applied in the combustion chambers is increased; otherwise the method advances to 164, where the boost tank is finally open to the intake manifold. This action causes the air pressurized in the boost tank to be discharged to the intake manifolds. The method then advances to 162, where the throttle valve opening amount is reduced to compensate for the increased oxygen content in the air charge being supplied to the intake via the boost tank, and then to 164. Note that the air charge supplied to the combustion chambers under these conditions may include less than the expected amount of EGR. Following 164, method 146 returns.

The foregoing methods illustrate example scenarios for filling a boost tank and for discharging air from the boost tank depending on operating conditions of the engine system. The following method demonstrates that some conditions are envisaged where throttle valve closure triggers a filling of the boost tank, and other conditions are envisaged where throttle valve closure triggers a discharge of air from the boost tank.

Figure 12:
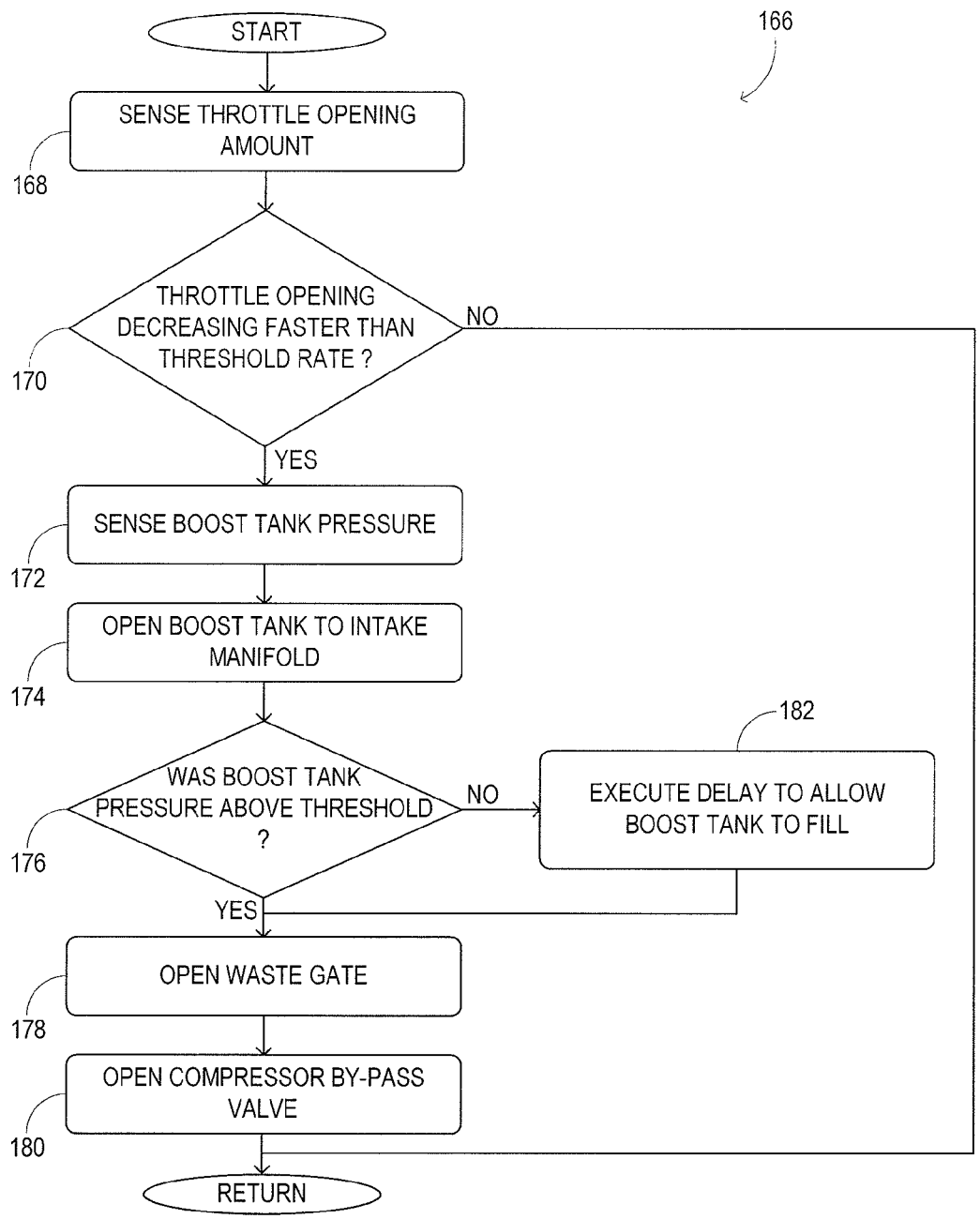
FIG. 12 illustrates an example method for responding to throttle valve closure in an engine system in accordance with an embodiment of this disclosure.

FIG. 12 illustrates an example method 166 for responding to throttle valve closure in one embodiment. The method begins at 168, where a throttle valve opening amount is sensed. The method then advances to 170, where it is determined whether the throttle valve opening amount is decreasing faster than a threshold rate. If the throttle valve opening amount is decreasing faster than the threshold rate, then the method advances to 172, where the pressure in the boost tank is sensed; otherwise, the method returns. The method then advances to 174, where the boost tank is opened to the intake manifold. If the pressure of the air in the boost tank was greater than the MAP at the time of opening, then this action causes the air pressurized in the boost tank to be discharged to the intake manifold. Accordingly, at least some of the air stored in the boost tank may be discharged to the intake manifold concurrent with throttle closure. The boost tank may be opened to the intake manifold actively (e.g., by actuating an electronically controlled valve) or passively (e.g., by pressure-induced cracking of a check valve). The method then advances to 176, where it is determined whether the boost tank pressure was above a threshold value at the time of sensing. If the boost tank pressure was above the threshold value at the time of sensing, then the method advances to 178, where the waste gate of the turbine is opened, and to 180, where by-pass valve of the compressor is opened. These actions allow EGR-diluted air from the intake to be displaced and flushed out by air from the boost tank.

However, if it is determined at 176 that the boost tank pressure was not above the threshold value at the time of sensing, then the method advances to 182, where a delay is executed. The delay may provide sufficient time for compressed air from the turbocharger compressor to be admitted to the boost tank. The delay may be a fixed or variable delay. In one embodiment, a variable delay may be applied, and may extend until the pressure in the boost tank has risen to a desired value, or, has approached a recommended pressure rating of the boost tank. In another embodiment, the delay may be extended until the relative amount of exhaust gas in the air pressurized in the boost tank approaches a desired value. In yet another embodiment, during or in advance of the delay, an EGR valve that regulates a flow of engine exhaust to the turbocharger compressor may be adjusted. In this manner, the relative amount of engine exhaust in the air pressurized in the boost tank may be varied based on engine operating conditions. As a result of the delay, the boost tank may be open to the compressor outlet during full throttle valve closure. Thus, the boost tank may absorb the high pressure spike that occurs on full throttle valve closure, thereby maximizing air pressure in the boost tank. Further, effluent of the compressor may be admitted to the boost tank when a waste gate of the turbine is closed, so that the boost tank is filled from a TIP source greater than MAP. Following 182, the method returns to 178 and to 180, where the waste gate and compressor by-pass valves are finally opened.

Configurations that include an auxiliary throttle valve in addition to a main throttle valve enable all of the control functions described hereinabove, and others as well. For example, air from a compressor and/or an air pump may be stored in a boost tank and subsequently discharged to an intake manifold under various operating conditions. These include conditions of increased opening of the main throttle valve, tip-in, conditions of decreased opening of the main throttle valve, and tip-out. In one embodiment, air having a first relative amount of exhaust gas may be stored during a first operating condition and discharged in response to increased opening of the main throttle valve. Further, air having a second, lower, relative amount of exhaust gas may be stored during a second operating condition and discharged in response to closure of the main throttle valve. In this example, the second operating condition may be characterized by a greater engine speed than the first operating condition.

Other embodiments are contemplated as well. For example, instead of the method shown in FIG. 12, the boost tank can simply be filled when excess boost is available, and when the pressure inside the boost tank is below a threshold. In this case, excess boost may be available whenever the compressor bypass valve would otherwise be commanded open, whenever the wastegate would otherwise be commanded open, or whenever TIP>MAP+a small pressure margin. Such conditions could determine inter alia when to try use compressor boost to fill the boost tank. Further control finesse could be applied to affect conditions to purposely and opportunistically provide the excess boost conditions.

Figure 13:
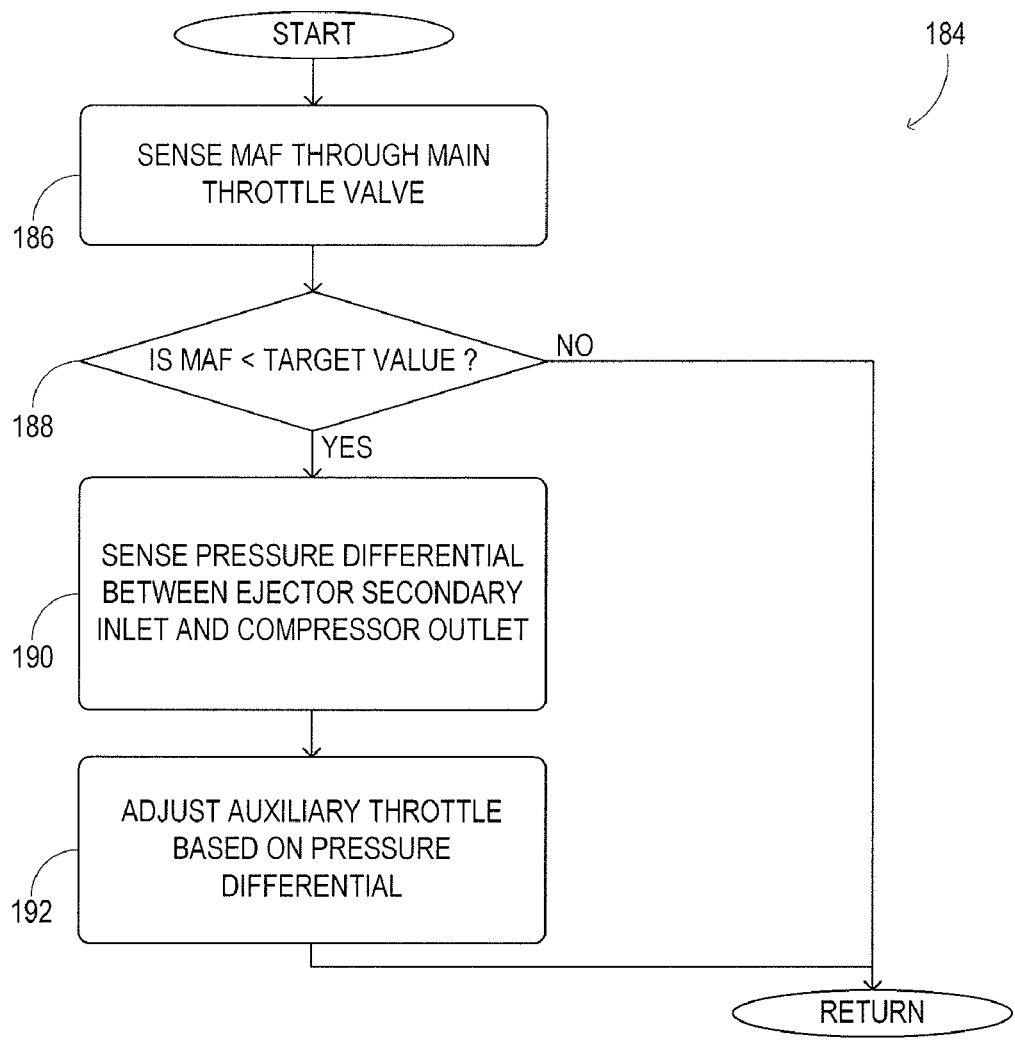
FIG. 13 illustrates an example method for regulating a supply of air to an intake manifold coupled to main and auxiliary throttle valves in accordance with an embodiment of this disclosure.

FIG. 13 illustrates an example method 184 for regulating an air supply to an intake manifold via main and auxiliary throttle valves in one embodiment. The method may be enabled by an engine system having main and auxiliary throttle valves, such as engine system 80 of FIG. 4. The method may be enacted whenever an electronic control system of the vehicle requires a change in manifold air flow. In one embodiment, the method is enacted when the main throttle valve is opened, so that air from the compressor is admitted to the intake manifold.

Method 184 begins at 186, where an air flow rate through a main throttle valve is sensed. The manifold air flow may be sensed by interrogation of a manifold air flow (MAF) sensor or in any other suitable manner. The method then advances to 188, where it is determined whether the sensed air flow rate is less than a target value of the MAF (based on operator engine torque demand, engine load, etc.). If the sensed air flow rate is not less than the target value, then the method returns. Otherwise, the method advances to 190, where a pressure differential between a compressor outlet and a secondary inlet of an air ejector coupled thereto is sensed. The method advances to 192, where an auxiliary throttle valve opening amount is adjusted based on the sensed pressure differential. In this manner, some of the air stored in the boost tank may be discharged to the intake manifold via the auxiliary throttle valve. In one scenario, this action may displace EGR-diluted air in the intake manifold in response to tip-out and/or full or partial throttle closure, for example. Such displacement is further enabled in embodiments where the main throttle valve is meanwhile held open, so that the EGR-diluted air may be released from the intake manifold. In one embodiment, the auxiliary throttle valve opening may be increased when the air ejector secondary inlet pressure is lower than the compressor outlet pressure. In other scenarios, where displacement of EGR-diluted air from the intake manifold is not desired, the main throttle valve may be closed during or before discharging the stored air via the auxiliary throttle valve to prevent reverse air flow through the main throttle valve. Accordingly, stored air may be discharged via the auxiliary throttle valve when the TIP is below a threshold, at tip-in, and/or in response to full or partial main throttle valve opening. In these and other embodiments, the stored air may be discharged via the auxiliary throttle valve while additional air is drawn into the intake manifold via the air ejector coupled between the boost tank and the intake manifold. Further, the auxiliary throttle valve opening amount may be decreased when the air ejector secondary inlet pressure is greater than the compressor outlet pressure. In one embodiment, the stored air may be discharged through a pressure recovery cone coupled between the air ejector and the intake manifold. In another embodiment, where a check valve is coupled upstream of the auxiliary throttle valve, some or all of the control elements of this method may be enacted passively. Following 192, the method returns.

The foregoing method shows inter alia how the opening amount of an auxiliary throttle valve in a suitably configured engine system may be controlled to emulate a passive check valve. Other methods are envisaged in which a main throttle valve in a suitably configured engine system may be actively controlled to emulate a passive check valve.

Figure 14:
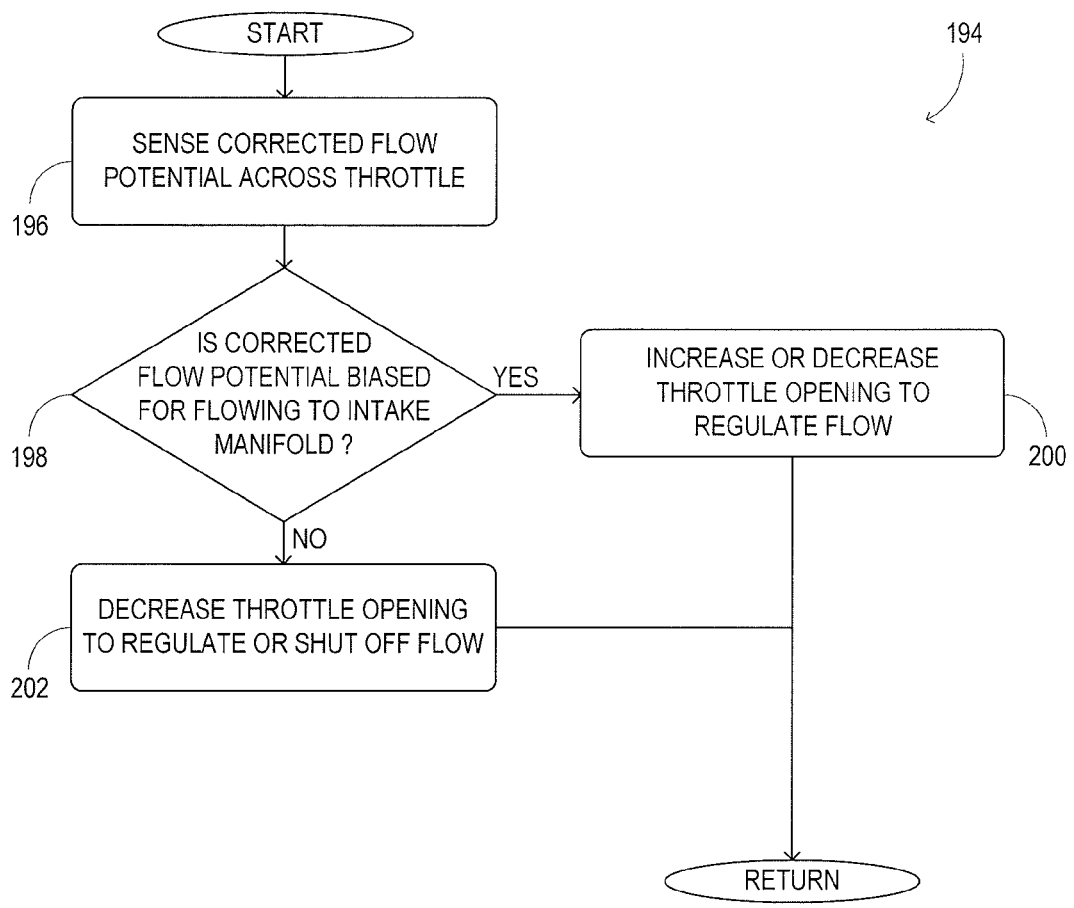
FIG. 14 illustrates a method for providing unidirectional air flow through a throttle valve in an engine system in accordance with an embodiment of this disclosure.

FIG. 14 illustrates an example method 194 for ensuring unidirectional air flow through a main throttle valve in a suitably configured engine system. In such a system, the main throttle valve may have no check valve coupled in series with it, and may thereby be configured to admit air flow in a forward direction and in a reverse direction. The method begins at 196, where a corrected flow potential across the main throttle valve is sensed. The corrected flow potential may be sensed by interrogating one or more sensors coupled in the engine system. In one embodiment, the corrected flow potential may correspond to TIP−MAP−DELTA, where TIP is the throttle inlet pressure upstream of the main throttle valve, MAP is the manifold air pressure, and DELTA corresponds to a relatively small 'cracking' pressure—e.g., 1 pound per square inch. The method then advances to 198, where it is determined whether the corrected flow potential is positive—viz., whether it is oriented to cause air to flow through the throttle valve toward the intake manifold. If it is determined that the corrected flow potential is positive, then the method advances to 200, where the opening amount of the throttle valve is adjusted (increased or decreased) in order to regulate the MAF to the desired level. However, if the corrected flow potential is not positive—viz., if it is oriented to cause air to flow through the throttle valve from the intake manifold—then the method advances to 202, where the throttle valve opening amount is decreased to regulate or shut off air flow through the main throttle valve. Following 200 or 202, the method returns.

Figure 15:
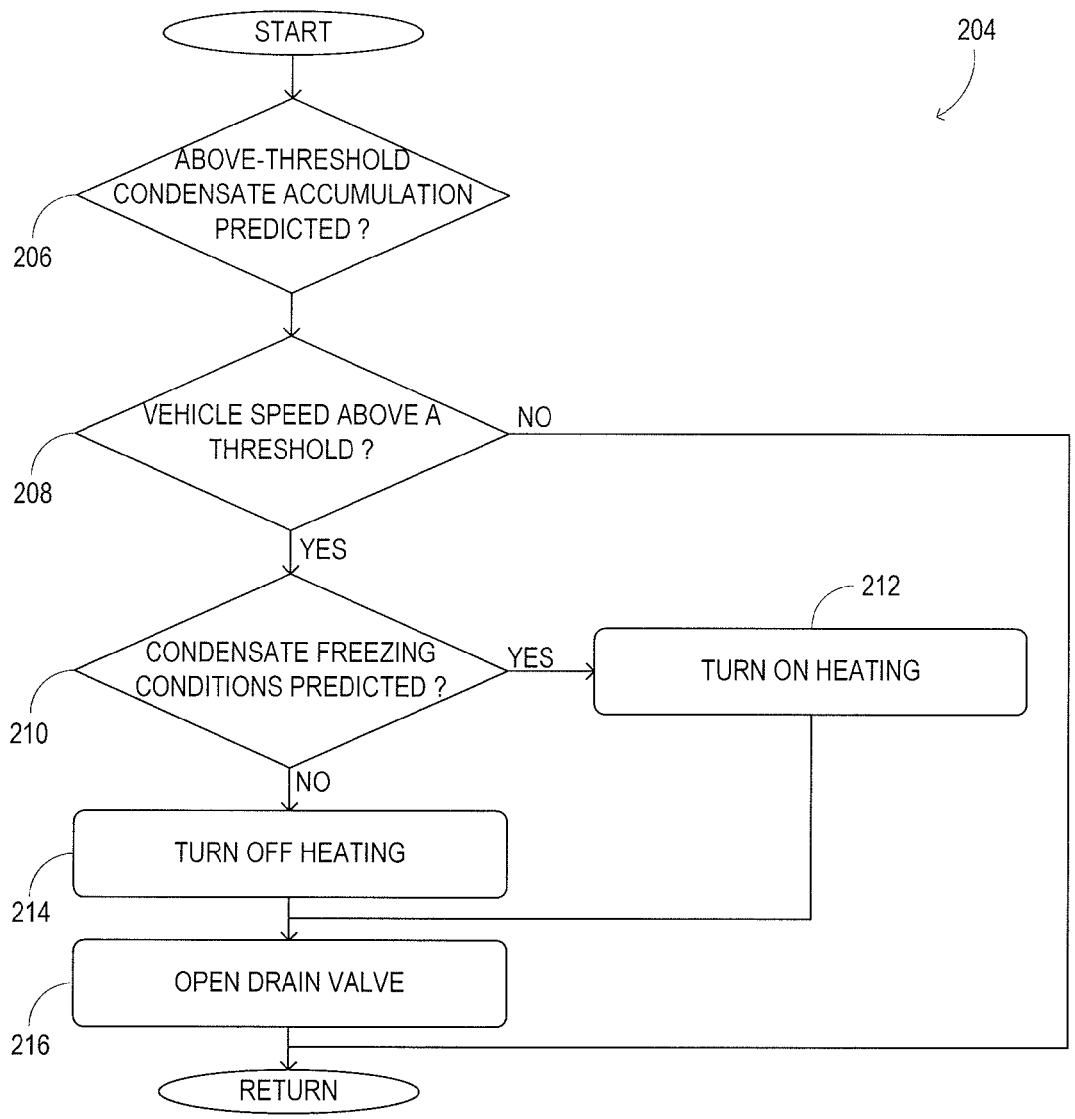
FIG. 15 illustrates an example method for draining a compressed air boost tank in an engine system of vehicle in a manner in which an occupant of the vehicle is unlikely to notice, in accordance with an embodiment of this disclosure.

FIG. 15 illustrates an example method 204 for releasing condensate from a boost tank in a vehicle when the occupants of the vehicle are unlikely to notice. The method begins at 206, where it is determined whether the predicted amount of condensate accumulation in the boost tank is above a threshold. If the predicted amount of condensate accumulation is not above the threshold, then the method returns. Otherwise, the method advances to 208, where it is determined whether the vehicle speed is above a threshold. If the vehicle speed is not above the threshold, then the method returns. Otherwise, the method advances to 210, where it is determined whether condensate freezing conditions are predicted. If condensate freezing conditions are predicted, then the method advances to 212, where the boost tank and a drain valve or other appliance for draining the boost tank are actively heated. The condensate and drain valve may be heated by energizing an electrical heating element in thermal communication with the condensate or by flowing a heated fluid such as engine exhaust or engine coolant through a conduit in thermal communication with the condensate and drain valve, for example. After this action, the method then returns to 206. In this manner, the release of the condensate from the boost tank may be delayed until the condensate is unfrozen. However, if it is determined that condensate freezing conditions are not predicted, then the method advances to 214, where such heating is turned off. From 214, the method advances to 216, where a normally closed, electronically controlled valve configured to drain condensate from the boost tank is opened. Following this action, the method returns. Thus, the condensate may be released from the boost tank when the condensate is unfrozen and when a noise level of the vehicle is above a noise threshold. In this manner, the condensate may be released easily and without drawing the attention of the occupants of the motor vehicle. In the illustrated embodiment, vehicle speed is used as a surrogate or predictor of noise level. It will be appreciated, however, that other surrogates and predictors of noise level are equally applicable.

In another embodiment, the condensate may be actively pumped out of the boost tank, not merely drained from the boost tank under the force of gravity. In yet another embodiment, the condensate may be forced out of the boost tank due to the pressure of the compressed air stored therein.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, this disclosure includes all novel and non-obvious combinations and sub-combinations of the various systems and methods disclosed herein, as well as any and all equivalents thereof.

The invention claimed is:

1. A method for providing air to a combustion chamber of an engine, the engine including a turbocharger compressor and a boost tank selectably coupled to an intake manifold, comprising:

varying a relative amount of engine exhaust in air pressurized in the boost tank based on engine operating conditions, including admitting an effluent of the turbocharger compressor to the boost tank; and selectively discharging the air pressurized in the boost tank to the intake manifold.

2. The method of claim 1, wherein varying the relative amount of engine exhaust comprises pressurizing air having a first relative amount of engine exhaust before increasing a throttle valve opening, and wherein discharging the air to the intake manifold comprises discharging the air having the first relative amount of engine exhaust when the throttle valve opening is increased.

3. The method of claim 2, wherein varying the relative amount of engine exhaust comprises pressurizing air having a second relative amount of engine exhaust before decreasing the throttle valve opening, wherein the second relative amount is less than the first relative amount, and wherein discharging the air to the intake manifold comprises discharging the air having the second relative amount of engine exhaust when the throttle valve opening is decreased.

4. The method of claim 1, wherein admitting the effluent of the turbocharger compressor to the boost tank comprises admitting the effluent during throttle valve closure.

5. The method of claim 1, wherein the turbocharger compressor is mechanically coupled to a turbine, and wherein admitting the effluent of the turbocharger compressor to the boost tank comprises admitting the effluent when a waste gate of the turbine is closed.

6. The method of claim 1, wherein varying the relative amount of engine exhaust comprises adjusting a valve that regulates a flow of engine exhaust to the turbocharger compressor.

7. A method for providing air to an engine including a compressor and a boost tank selectably coupled to an intake manifold, comprising:

pressurizing and storing air in the boost tank during selected excess boost conditions;

discharging air stored in the boost tank to the intake manifold concurrent with throttle closure of an intake-air throttle coupled between the intake manifold and the compressor; and discharging some of the air stored in the boost tank to the intake manifold in response to throttle opening, wherein pressurizing and storing air in the boost tank comprises varying a relative amount of engine exhaust in the air pressurized in the boost tank based on engine operating conditions, and wherein varying the relative amount of engine exhaust comprises storing air having a greater relative amount of engine exhaust during lower engine-speed conditions and storing air having a lower relative amount of engine exhaust during higher engine-speed conditions.

8. The method of claim 7, wherein pressurizing and storing the air in the boost tank comprises pressurizing and storing gas when a relative amount of engine exhaust in an effluent of the compressor is below a threshold.

9. The method of claim 7, further comprising storing combustion exhaust gas from fueled cylinders in the boost tank during selected conditions.

10. The method of claim 7, further comprising varying a relative amount of engine exhaust from fueled cylinders in air pressurized in the boost tank based on engine operating conditions.

11. A system comprising:

a compressor fluidically coupled to a throttle valve, mechanically coupled to an exhaust-driven turbine, and configured to admit exhaust tapped from downstream of the turbine;

an intake manifold fluidically coupled to the throttle valve and selectably coupled to a boost tank, and a by-pass valve and a fixed flow restrictor coupled in series between an inlet and an outlet of the compressor, the flow restrictor comprising a laminar flow element.

12. The system of claim 11, wherein a pressure recovery cone is coupled fluidically between the boost tank and the intake manifold.

* * * * *